United States Patent
Barnard et al.

(10) Patent No.: US 8,022,602 B2
(45) Date of Patent: Sep. 20, 2011

(54) PIEZOELECTRIC RESONANT POWER GENERATOR

(75) Inventors: Jason J. Barnard, Katy, TX (US); Robert S. O'Brien, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 12/552,822

(22) Filed: Sep. 2, 2009

(65) Prior Publication Data

US 2009/0322185 A1    Dec. 31, 2009

Related U.S. Application Data

(62) Division of application No. 11/728,760, filed on Mar. 27, 2007, now abandoned.

(51) Int. Cl.
*H02N 2/18* (2006.01)
(52) U.S. Cl. .................. 310/339; 310/321; 310/328
(58) Field of Classification Search .............. 310/339, 310/321, 328
See application file for complete search history.

(56) References Cited

U.S. PATENT DOCUMENTS

| | | | | |
|---|---|---|---|---|
| 4,472,113 A | * | 9/1984 | Rogen | 417/321 |
| 4,518,888 A | * | 5/1985 | Zabcik | 310/334 |
| 4,788,467 A | * | 11/1988 | Plambeck | 310/323.01 |
| 4,945,984 A | | 8/1990 | Price | |
| 5,159,226 A | * | 10/1992 | Montgomery | 310/333 |
| 5,301,169 A | | 4/1994 | Baria et al. | |
| 5,409,356 A | * | 4/1995 | Massie | 417/416 |
| 6,550,534 B2 | | 4/2003 | Brett | |
| 6,776,256 B2 | | 8/2004 | Kostyuchenko et al. | |
| 2002/0075114 A1 | * | 6/2002 | Hall et al. | 336/192 |
| 2003/0178205 A1 | | 9/2003 | Henderson | |
| 2005/0205248 A1 | * | 9/2005 | Barolak et al. | 166/66.5 |
| 2005/0207279 A1 | * | 9/2005 | Chemali et al. | 367/83 |
| 2005/0269078 A1 | | 12/2005 | Morgenthaler | |
| 2006/0151179 A1 | | 7/2006 | Boyadjieff et al. | |
| 2006/0260804 A1 | * | 11/2006 | O'Malley | 166/249 |
| 2008/0238252 A1 | | 10/2008 | Barnard | |
| 2009/0079199 A1 | | 3/2009 | Tubel | |

OTHER PUBLICATIONS

Evolution of Oilfield Technology, "All Pumped Up", The American Oil & Gas Historical Society; The Petroluem Age; vol. 3, No. 3; Sep. 2006; 1 page.

Restarick, Henry "Horizontal Completion Options in Reserviours Wtih Sand Problems" Society of Petroluem Engineers, Inc., Presentation at the SPE Middle East Oil Show, Bahrain, Mar. 11-14, 1995, SPE 29831.

Brian Champion, Fred Van Der Bas, Gerrit Nitters, "The Application of High Power Sound Waves for Wellbore Cleaning", SPE82197, Presentation at the SPE European Formation Damage Conference, Hague, Netherlands, May 13-14, 2003, Society of Petroleum Engineers Inc. pp. 1-10.

Fred Van Der Bas, Eric De Rouffignac, Pedro Zuiderwijk, Sau-Wai Wong, Diederik Van Batenburg, Bob Birchak, Kwang Yoo, "Radial Near Wellbore Stimulation by Acoustic Waves", SPE 86492, Presentation at the SPE International Symposium and Exhibition on Formation Damage Control, Lafayette, Louisiana, US, Feb. 18-20, 2004, Society of Petroleum Engineers, Inc. pp. 1-7.

(Continued)

*Primary Examiner* — Walter Benson
*Assistant Examiner* — Bryan Gordon
(74) *Attorney, Agent, or Firm* — Cantor Colburn LLP

(57) ABSTRACT

A method for generating power in a wellbore includes moving an actuator; inducing an oscillating stress on a piezoelectric component with the actuator; and generating a voltage with the piezoelectric component in response to the induced stress on the piezoelectric component.

5 Claims, 3 Drawing Sheets

OTHER PUBLICATIONS

James R. Ammer, James C. Furness, Jr., Michael L Wilkey, Donald O. Johnson, "Well Bore Remediation Using Sonication", Apr. 1999, pp. 1-7.

International Search Report and Written Opinion, mailed on Aug. 17, 2008, International Application No. PCT/US2009/030723, Written Opinion 10 pages, International Search Report 4 pages.

R.V. Westemark, J.F. Brett, D.R. Maloney, "Enhanced Oil Recovery with Downhole Vibration Stimulation" SPE 67303, Presentation at the SPE Production and Operations Symposium, Oklahoma City, Oklahoma, Mar. 24-27, 2001, Society of Petroleum Engineers Inc., pp. 1-13.

Aziz Harthy, Ramzi Abdulkadir, Iqbal Sipra, Jam Seaby, Avadhut Raiturkar, Michael Bailey, Jim Venditto, "Screen and Near-Wellbore Cleaning and Stimulation Tools Evaluation: Recent Experience in Well Operation", SPE 89653, Presentation at the SPE/ICoTA Coiled Tubing Conference and Exhibition, Houston, Texas, US, Mar. 23-24, 2004, Society of Petroleum Engineers Inc., pp. 1-6.

Xiao Guo, Zhimin Du, Guangquan Li, Zhuangzhi Shu, "High Frequency Vibration Recovery Enhancement Technology in the Heavy Oil Fields of China" SPE86956, Presentation at the SPE international Thermal Operations and Heavy Oil Symposium and Western regional meeting, Bakersfield, CA, US, Mar. 16-18, 2004, pp. 1-18.

* cited by examiner

US 8,022,602 B2

PIEZOELECTRIC RESONANT POWER GENERATOR

CROSS REFERENCE TO RELATED APPLICATION

This application is a divisional application of U.S. application Ser. No. 11/728,760, filed Mar. 27, 2007, the contents of which are incorporated by reference herein in their entirety.

BACKGROUND

For nearly a century, pump jacks have been used in the production of hydrocarbons from downhole formations. Such jacks are seen atop many oil fields, their rhythmic movements common. It is well known how the pump jacks work, which is by moving sucker rods up and down within the wellbore. For the same near century, the pumps have worked very well doing precisely that, pumping.

More modern well systems while still employing pump jacks also are instrumented extensively downhole. This requires substantial amounts of available power in the downhole environment. Power is for the most part delivered from the surface but due to the small amount of available space in the hole, allocation of such space is a source of trepidation. Since the hydrocarbon recovery art is always in search of improved means to produce hydrocarbons, any reduction in components needed within the cross-section of the wellbore would be well received.

SUMMARY

A method for generating power in a wellbore includes moving an actuator; inducing an oscillating stress on a piezoelectric component with the actuator; and generating a voltage with the piezoelectric component in response to the induced stress on the piezoelectric component.

BRIEF DESCRIPTION OF THE DRAWINGS

Referring now to the drawings wherein like elements are numbered alike in the several Figures.

DETAILED DESCRIPTION

In order to enhance understanding of the invention applicants have elected to describe briefly the components of the tool followed by a discussion of its operation.

Figure 1:
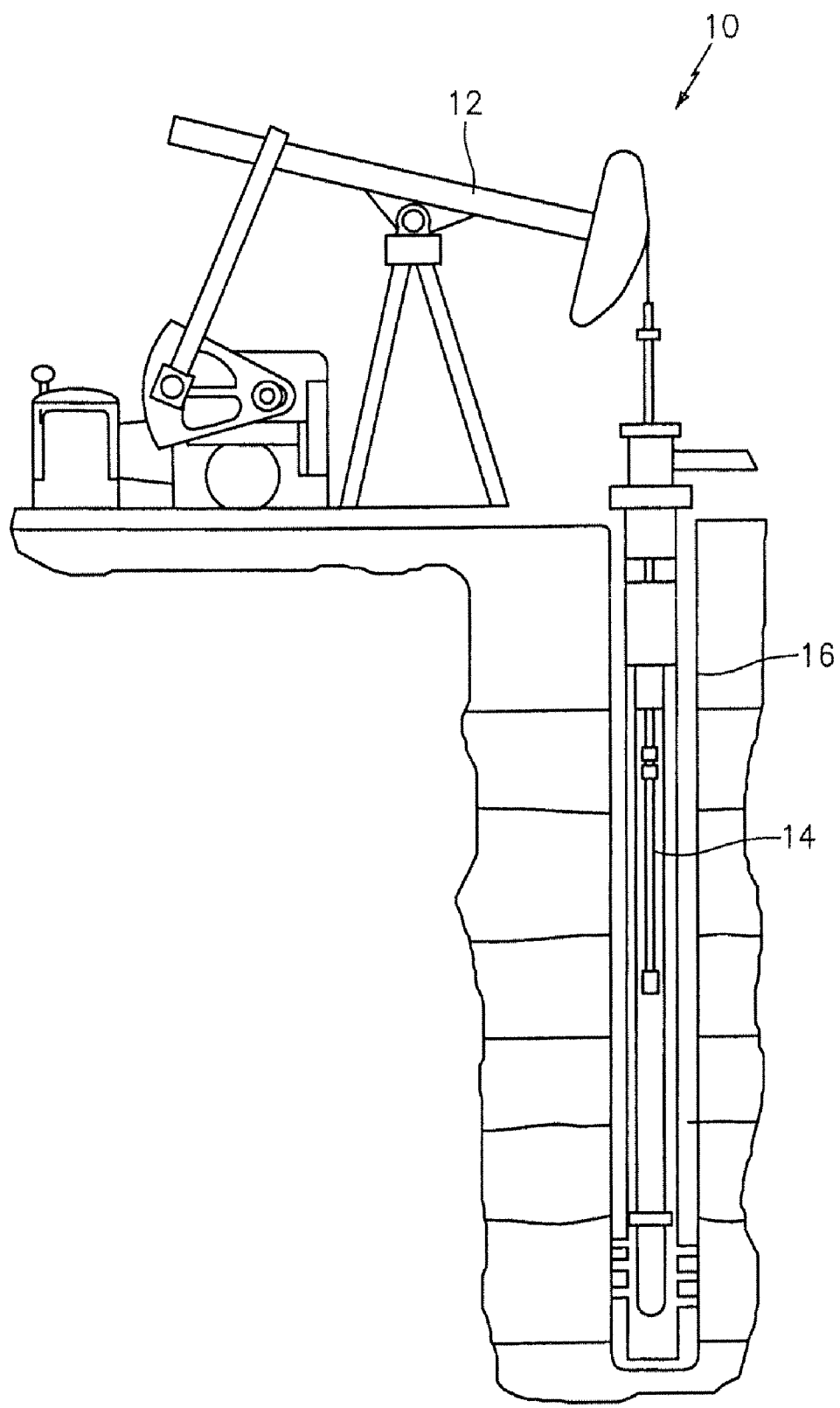
FIG. 1 is a schematic view of a pump jack.

Referring to FIG. 1, a pump jack 10 is illustrated schematically. One of skill in the art will recognize a walking beam 12 and sucker rod 14 extending into a wellbore 16. The pump jack 10 as is known, reciprocates the sucker rod up and down in the wellbore. The sucker rod 14 of the pump jack is the only portion of the pump jack that is modified in connection with the invention and therefore other components of the pump jack need not be described in detail. Also to be noted is that although a pump jack is utilized herein as a source of movement, other sources of similar movement could be substituted while maintaining the benefits of the inventive concept.

Figure 2:
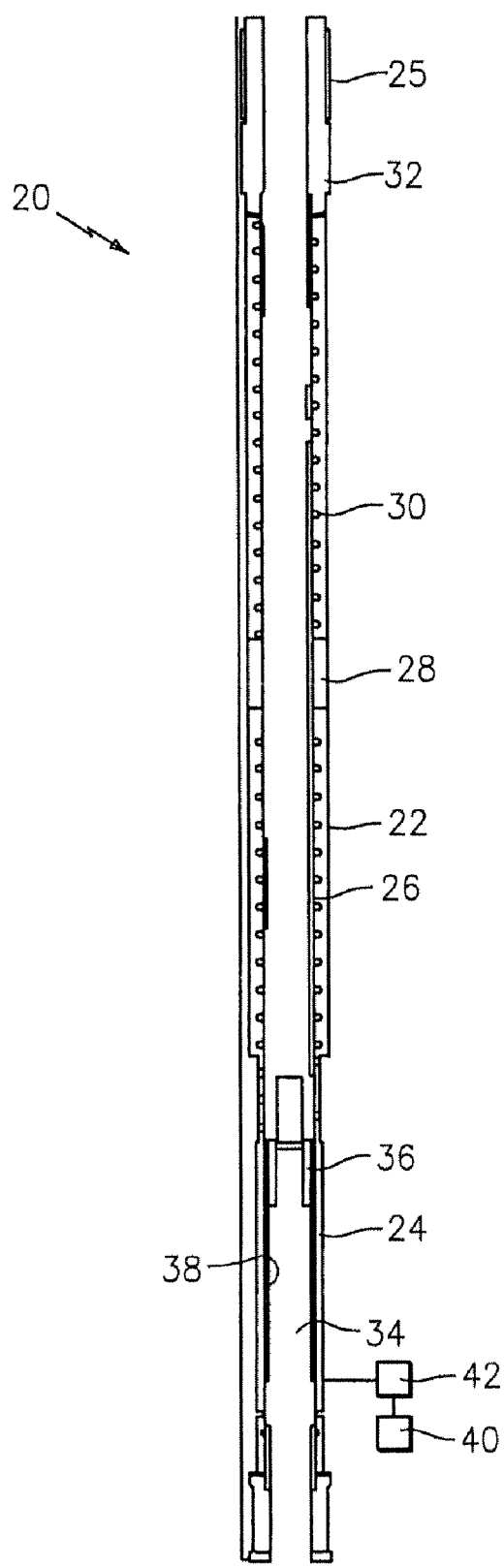
FIGS. 2-6 are each schematic views of a piezoelectric power generation arrangement utilizing the pump jacks in different positions.

Referring to FIG. 2, a power generation arrangement 20 for use in combination with a reciprocating source such as a pump jack is illustrated. The arrangement includes a housing 22, within which is disposed at least one piezoelectric component 24 which may be a single piezoelectric element or a plurality of elements in a stack. The component 24 is in physical force transmission contact with a resilient member (stress inducer) 26, illustrated as a coil spring, but could be any device similarly capable of oscillatory movement. Spring 26 is in operable communication with a magnetic element 28, which may be a rare earth magnet or may simply be a ferrous element. The magnetic element 28 is also in operable communication with another resilient member 30 (also illustrated as a coil spring for convenience but as noted for spring 26, other devices capable of oscillatory movement are equally applicable). Spring 30 may be the same or different from spring 26, providing that the desired oscillatory motion of magnetic element 28 and associated mechanical compression of component 24 is preserved. Spring 30 is bounded by a compression cap 32 in the illustrated embodiment but could alternatively be bounded by another piezoelectric component (not shown) that essentially would be a mirror image of the component 24. In such an arrangement, power generation would occur based upon movement of the magnetic element 28 in both axial directions.

Through an inside dimension of all of the foregoing components is at least one sucker rod 14 or sucker rod extension 34 having at least one magnetic element 36 disposed thereat. Magnetic element 36 may be a magnet or simply a ferrous element providing that either it or the magnetic element 28 is in fact a magnet. At least one of the two magnetic elements 28 and 36 must provide a magnetic field for operability of the invention. It is to be noted that the sucker rod 34 is used in an exemplary manner and is not a limitation of the invention. Any support for the magnetic element 36 that is an oscillatory structure itself is substitutable. Magnetic element 36, if indeed a magnet, is to be attractively polarized relative to magnetic element 28 such that a strong attractive force is generated between the magnetic elements. Further noted is that at portions of the sucker rod 34 other than at the at least one magnetic element 36, there is disposed a non-magnetic sleeve 38. Sleeve 38 that functions to align the magnetic elements and the sucker rod to ensure that they remain non-contacting in nature thereby reducing frictional losses otherwise caused by magnetic attraction of the magnetic element 28 to the sucker rod 34, which is usually a metal, or actual contact between magnetic elements 28 and 36.

As one of skill in the art should recognize the sucker rod 34 moves up and down pursuant to the motion of the walking beam pictured in FIG. 1. This movement is harnessed as taught herein not only for its original purpose of pumping stubborn well fluids to the surface but to generate power for downhole devices as well.

Figure 3:
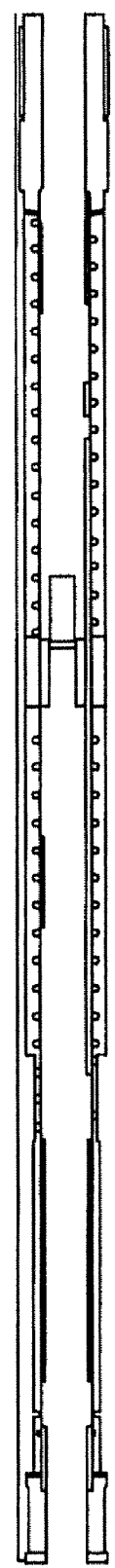
Figure 4:
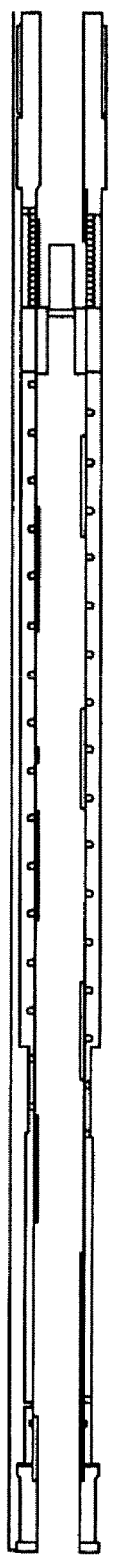
Figure 5:
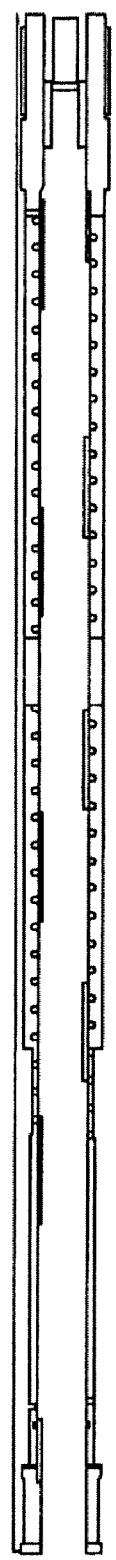
Figure 6:
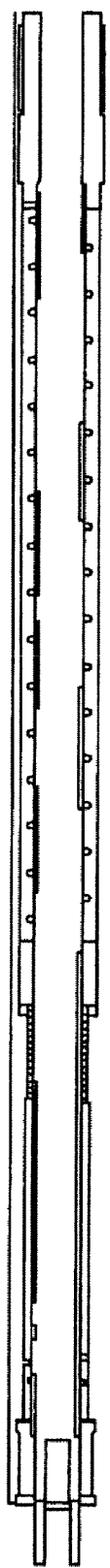

Referring to FIGS. 2-6 as a sequence of drawings showing the device in different positions, the operation thereof will become clearer. As magnetic element 36 draws nearer magnetic element 28 the attractive magnetic fields they exhibit (or one field attracting the ferrous element of the other) begin to draw magnetic element 28 toward magnetic element 36, to some extent overcoming spring 26 in compression and spring 30 in tension. This movement of magnetic element 28 will impart a compressive load, through spring 26 to component 24 thereby creating an electrical potential in component 24. Since the magnetic element 36 is moving towards magnetic element 28, it should be understood that the magnitude of the compressive load on the component 24 for this movement is small and consequently the potential generated is small. As the sucker rod continues, its movement uphole and as illustrated in FIG. 3, the magnetic elements 28 and 36 align and thereby are at the highest attractive force therebetween. Yet farther uphole movement of sucker rod 34 draws magnetic element 28 to compress spring 30 while extending spring 28. This continues, since the magnetic elements are engineered to have a greater attractive force to each other than the springs 26 and 30 have spring force to separate them, until the spring 30 is substantially maximally compressed. After such compression, illustrated in FIG. 4, magnetic element 36 is moved farther uphole with sucker rod 34 thereby misaligning the magnetic elements and thus reducing the attractive forces therebetween. At a point, the attractive force between magnetic element 28 and magnetic element 36 is overcome by the spring force of springs 30 and 26. As this occurs, springs 30 and 26 propel magnetic element 28 back toward component 24 as illustrated in FIG. 6. This motion, as one of skill in the art should appreciate, presents a relatively large compressive load on the component 24 thereby generating a large electrical potential. Further, because of the springs of 30 and 26, the magnetic element 28 will oscillate causing a number of compressions on the component 24, each developing an electrical potential. Since the oscillations diminish in magnitude with each cycle, the compressive load is also reduced but some of the benefit is still achieved by oscillatory motion until magnetic element 28 is magnetically "bound" again to magnetic element 36 (or another similar magnetic element if the sucker rod stroke is long enough to create multiple actuations due to magnetic interaction using multiple magnetic elements 36). A capacitor 40 is electrically connected to the piezoelectric component 24 to store the potential generated by the disclosed system for use when needed.

As was noted hereinabove, a pump jack is but one source of movement for a system such as that disclosed. Further, and also as noted, in an alternative embodiment, compression cap 32 could be substituted by an additional piezoelectric component so that oscillatory compressive loading on both springs 30 and 26 will produce potentials. This will increase available power downhole from the system as described. In addition hereto, rapid unloading of the component 24 will create a voltage as well. This voltage may be made usable by employing a rectifier bridge 42 in the electrical circuit connected to the component 24.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A method for generating power in a wellbore comprising:
   moving an actuator;
   inducing an oscillating stress on a piezoelectric component with the actuator by energizing a resilient stress inducer;
   allowing the resilient stress inducer to oscillate after being released from energizing;
   generating a voltage with the piezoelectric component in response to the induced stress on the piezoelectric component; and
   storing the voltage generated.

2. The method of generating power in a wellbore of claim 1 wherein the oscillation of the resilient stress inducer causes mechanical stress on the piezoelectric component.

3. The method of generating power in a wellbore of claim 1 wherein the storing is in a capacitor electrically connected to the piezoelectric component.

4. A method for generating power in a wellbore comprising:
   moving an actuator;
   inducing an oscillating stress on a piezoelectric component with the actuator by energizing a resilient stress inducer by moving a magnetic element to magnetically couple with another magnetic element in operable communication with the resilient stress inducer to one of compress or tension the resilient stress inducer;
   generating a voltage with the piezoelectric component in response to the induced stress on the piezoelectric component; and
   storing the voltage generated.

5. The method of generating power in a wellbore of claim 4 wherein the method comprising releasing the another magnetic element and allowing the magnetic element to oscillate on the resilient stress inducer to induce the stress on the piezoelectric component.

* * * * *